US012410734B2

(12) United States Patent
Ozeki

(10) Patent No.: US 12,410,734 B2
(45) Date of Patent: Sep. 9, 2025

(54) VARIABLE VALVE DEVICE

(71) Applicant: SUZUKI MOTOR CORPORATION, Hamamatsu (JP)

(72) Inventor: Hisashi Ozeki, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/894,584

(22) Filed: Sep. 24, 2024

(65) Prior Publication Data

US 2025/0109698 A1 Apr. 3, 2025

(30) Foreign Application Priority Data

Sep. 28, 2023 (JP) ................................ 2023-167727

(51) Int. Cl.
*F01L 13/00* (2006.01)
*F01L 1/18* (2006.01)
(Continued)

(52) U.S. Cl.
CPC .......... *F01L 13/0036* (2013.01); *F01L 1/181* (2013.01); *F01L 1/267* (2013.01); *F01L 1/46* (2013.01);
(Continued)

(58) Field of Classification Search
CPC ... F01L 1/053; F01L 2001/0535; F01L 1/181; F01L 2001/186; F01L 1/267; F01L 1/46;
(Continued)

(56) References Cited

U.S. PATENT DOCUMENTS 5,497,737 A 3/1996 Nakamura ................. 123/90.15
2006/0236968 A1* 10/2006 Falkowski .......... F01L 13/0005 123/90.27
(Continued)

FOREIGN PATENT DOCUMENTS

DE 10 2015 107 511 A1 11/2015
EP 3 203 043 A1 10/2015
(Continued)

OTHER PUBLICATIONS

Extended European Search Report dated Feb. 20, 2025, issued by the European Patent Office in corresponding application EP 24202361.2.

*Primary Examiner* — Jorge L Leon, Jr.
(74) *Attorney, Agent, or Firm* — Stein IP, LLC

(57) ABSTRACT

A variable valve device changes a valve lift amount in a cylinder head. The device includes: a camshaft having plural cams with different valve lift amounts; plural rocker arms in contact with the plural cams to move a valve; a switching mechanism that couples and separates the plurality of rocker arms by oil pressure; and an oil control valve that control the oil pressure. The switching mechanism includes a coupling piston and a separation piston that are moved forward and backward by the oil pressure. The plural rocker arms are coupled to one another along forward movement of the coupling piston. The plural rocker arms are separated from one another along forward movement of the separation piston. The oil control valve moves the coupling piston forward at a predetermined rotation phase of the camshaft and moves the separation piston forward at a predetermined rotation phase of the camshaft.

4 Claims, 9 Drawing Sheets

(51) Int. Cl.

| | |
|---|---|
| ***F01L 1/26*** | (2006.01) |
| ***F01L 1/46*** | (2006.01) |
| ***F02D 13/02*** | (2006.01) |
| *F01L 1/053* | (2006.01) |

(52) U.S. Cl.
CPC .......... *F02D 13/0226* (2013.01); *F01L 1/053* (2013.01); *F01L 2001/0535* (2013.01); *F01L 2001/186* (2013.01); *F01L 2820/031* (2013.01); *F02D 2013/0296* (2013.01)

(58) Field of Classification Search
CPC ............ F01L 13/0036; F01L 2820/031; F02D 13/0226; F02D 2013/0296
USPC .................................. 123/90.27, 90.4, 90.44
See application file for complete search history.

(56) References Cited

U.S. PATENT DOCUMENTS

| | | | | |
|---|---|---|---|---|
| 2008/0196680 | A1 | 8/2008 | Janak et al. | 123/90.12 |
| 2011/0271918 | A1 | 11/2011 | Nishikiori et al. | 123/90.1 |
| 2015/0330265 | A1 | 11/2015 | Haga | F01L 1/34 |

FOREIGN PATENT DOCUMENTS

| | | | | |
|---|---|---|---|---|
| EP | 3 540 185 | A1 | 2/2019 | |
| JP | 2009-185753 | A | 8/2009 | |
| JP | 2009-264199 | A | 11/2009 | |
| WO | WO-9313306 | A1 * | 7/1993 | F02D 17/02 |

* cited by examiner

VARIABLE VALVE DEVICE

CROSS-REFERENCE TO RELATED APPLICATIONS

This application is based on and claims priority under 35 USC 119 from Japanese Patent Application No. 2023-167727 filed on Sep. 28, 2023, the contents of which are incorporated herein by reference.

BACKGROUND

The present disclosure relates to a variable valve device.

There is known a variable valve device in which a plurality of rocker arms are coupled to one another to switch a valve operation (for example, see JP2009-264199A). In the variable valve device disclosed in JP2009-264199A, a pair of cams having different lift amounts are formed on a camshaft, and a pair of rocker arms are provided corresponding to the pair of cams. A switching mechanism is coupled to the pair of rocker arms, and a coupling state and a separation state of the pair of rocker arms are switched by applying oil pressure to the switching mechanism. A valve lift amount is changed by switching the cams that lift valves between when the pair of rocker arms are coupled and when the pair of rocker arms are separated.

SUMMARY OF INVENTION

According to an aspect of the present disclosure, there is provided a variable valve device configured to change a valve lift amount in a cylinder head. The variable valve device includes: a camshaft formed with a plurality of cams having different valve lift amounts; a plurality of rocker arms configured to be in contact with the plurality of cams and move a valve; a switching mechanism configured to couple and separate the plurality of rocker arms by oil pressure; and an oil control valve configured to control the oil pressure applied to the switching mechanism. The switching mechanism includes a coupling piston and a separation piston configured to be moved forward and backward by the oil pressure. The plurality of rocker arms are coupled to one another along forward movement of the coupling piston. The plurality of rocker arms are separated from one another along forward movement of the separation piston. The oil control valve is configured to move the coupling piston forward at a predetermined rotation phase of the camshaft, and to move the separation piston forward at a predetermined rotation phase of the camshaft.

DESCRIPTION OF EMBODIMENTS

In the above-described variable valve device of JP2009-264199A, the pair of rocker arms are coupled regardless of a rotation phase of the camshaft. Depending on the rotation phase of the camshaft, a valve lift may inhibit coupling of the pair of rocker arms. Even when the pair of rocker arms are coupled while avoiding a valve lift, the pair of rocker arms may not be smoothly separated from each other.

The present disclosure has been made in view of the above circumstances, and an object of the present disclosure is to provide a variable valve device capable of smoothly switching between a coupling state and a separation state of a plurality of rocker arms.

A variable valve device according to one aspect of the present disclosure is provided in a cylinder head and changes a valve lift amount. A plurality of cams having different valve lift amounts are formed on a camshaft, and a plurality of rocker arms for moving valves are in contact with the plurality of cams. The plurality of rocker arms are coupled and separated by a switching mechanism by oil pressure, and the oil pressure applied to the switching mechanism is controlled by an oil control valve. The switching mechanism includes a coupling piston and a separation piston that are moved forward and backward by the oil pressure, and the plurality of rocker arms are coupled to one another along forward movement of the coupling piston, and the plurality of rocker arms are separated from one another along forward movement of the separation piston. When oil is supplied from the oil control valve to the coupling piston, the coupling piston is moved forward at a predetermined rotation phase of the camshaft avoiding a valve lift, so that coupling of the plurality of rocker arms is not hindered by a valve lift. When the oil is supplied from the oil control valve to the separation piston, the separation piston is moved forward at the predetermined rotation phase of the camshaft avoiding a valve lift, so that separation of the plurality of rocker arms is not hindered by a valve lift.

Embodiment

Figure 1:
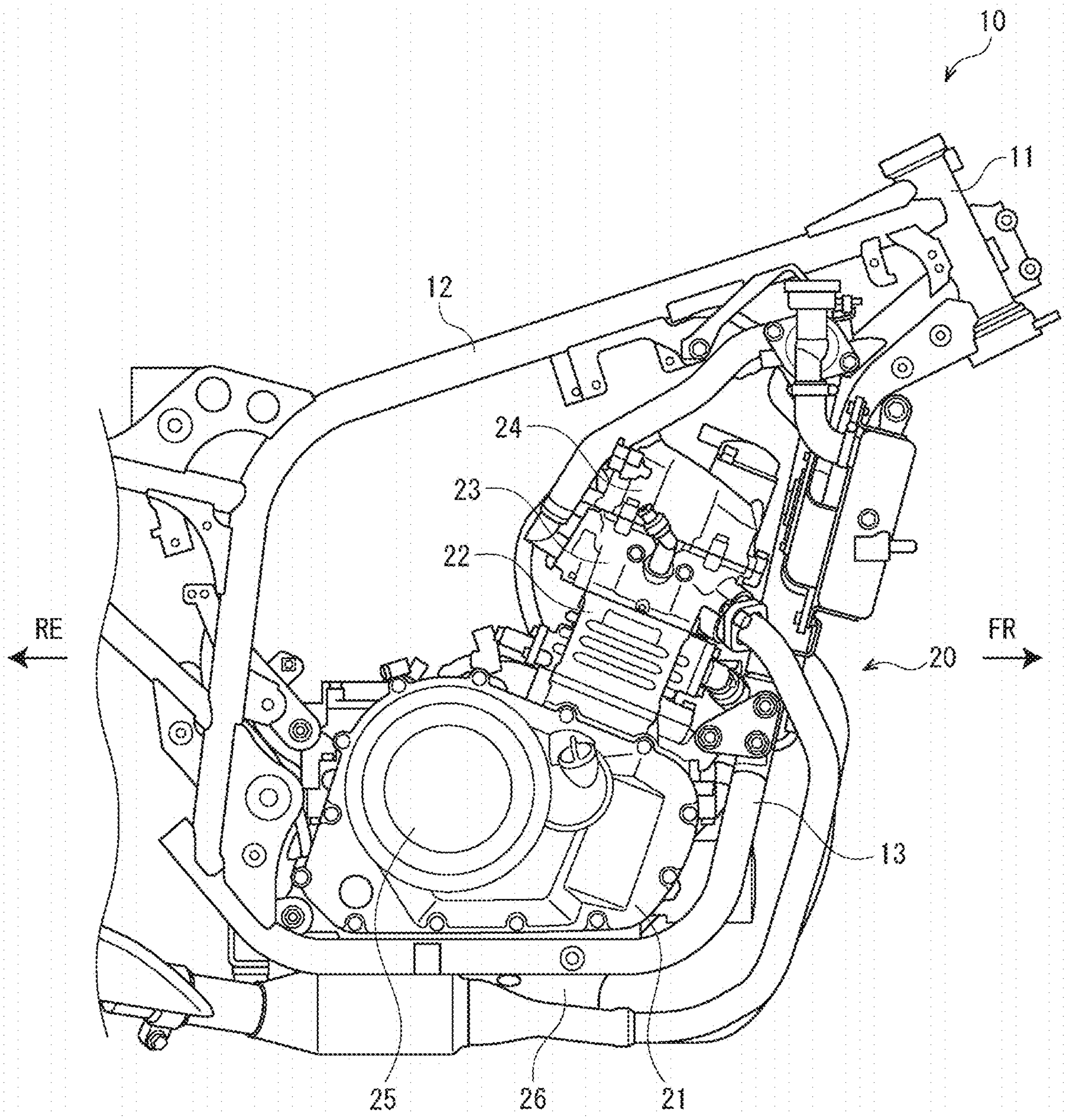
FIG. 1 is a right side view showing an engine and a vehicle body frame according to a present embodiment.
Figure 2:
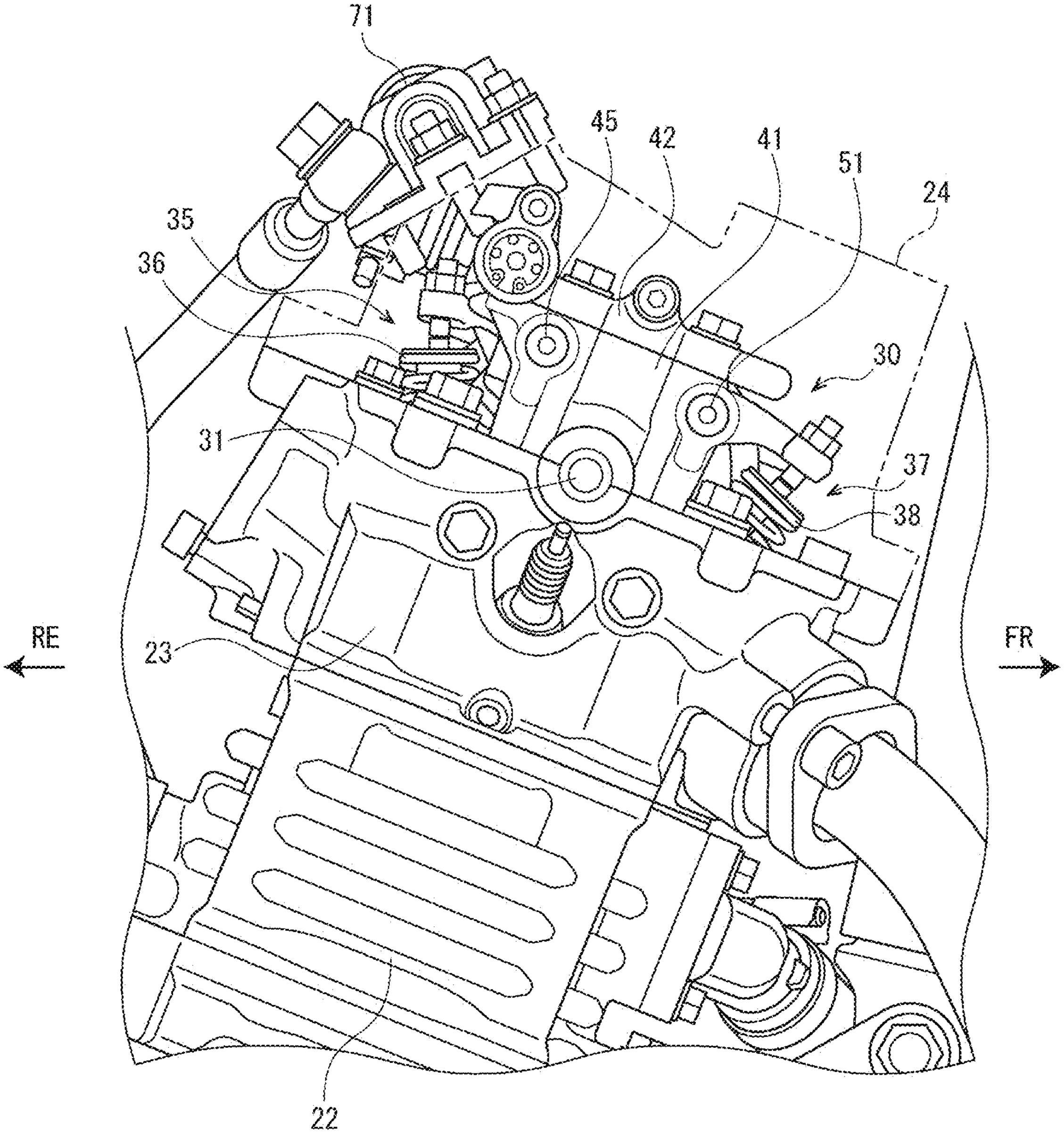
FIG. 2 is a right side view showing an upper portion of the engine from which a cylinder head cover is removed according to the present embodiment.
Figure 3:
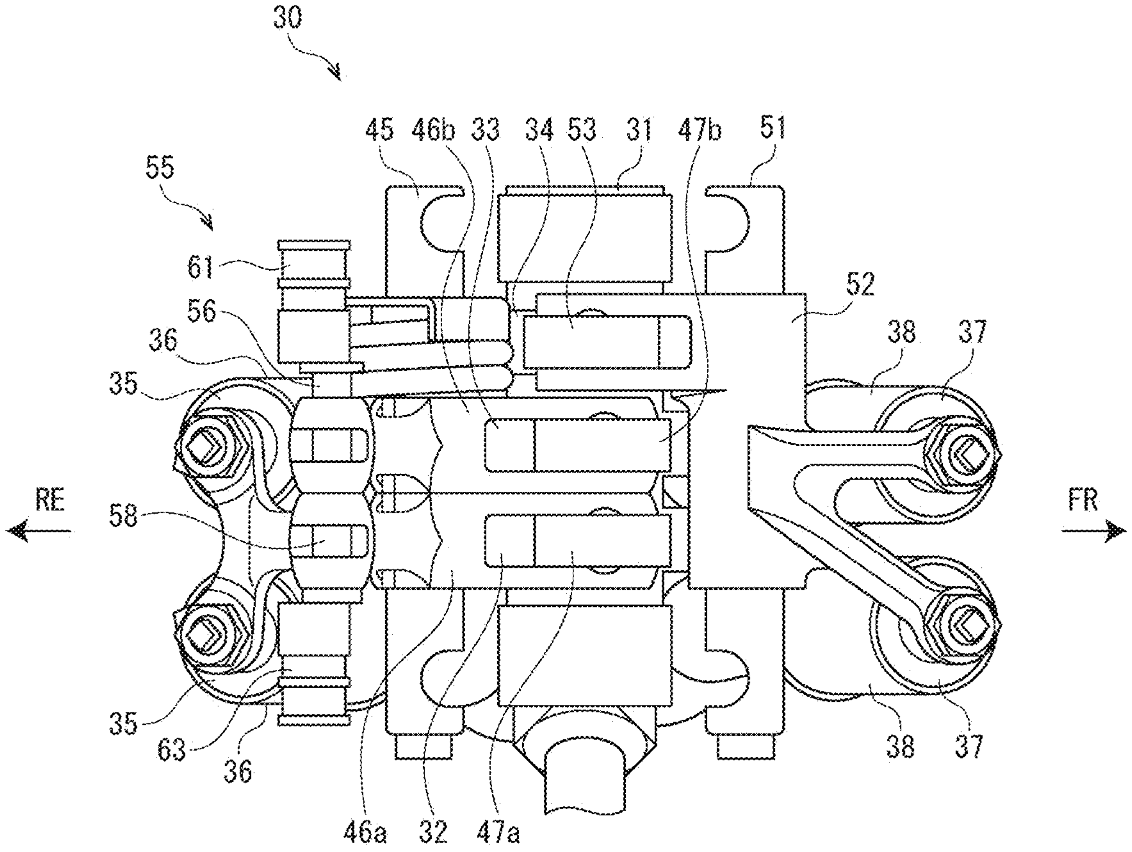
FIG. 3 is a schematic top view showing a variable valve device according to the present embodiment.

Hereinafter, a straddle-type vehicle according to an embodiment will be described with reference to the accompanying drawings. FIG. 1 is a right side view showing an engine and a vehicle body frame according to the present embodiment. FIG. 2 is a right side view showing an upper portion of the engine from which a cylinder head cover is removed according to the present embodiment. FIG. 3 is a schematic top view showing a variable valve device according to the present embodiment. In the following drawings, an arrow Fr indicates a vehicle front side, an arrow Re indicates a vehicle rear side, an arrow L indicates a vehicle left side, and an arrow R indicates a vehicle right side.

As shown in FIG. 1, the straddle-type vehicle includes various components such as an engine 20 and an electrical system which are mounted on a cradle type vehicle body frame 10. The vehicle body frame 10 includes a main tube 12 that extends rearward from an upper portion of a head pipe 11 and then is bent downward, and a down tube 13 that extends downward from a lower portion of the head pipe 11 and then is bent rearward. A rear end portion of the down tube 13 is joined to a lower end portion of the main tube 12 to form an installation space for the engine 20 inside the vehicle body frame 10. The main tube 12 supports a rear side of the engine 20, and the down tube 13 supports a front side and a lower side of the engine 20.

The engine 20 is a four-valve two-cylinder engine, and includes a crankcase 21, a cylinder 22 provided on the crankcase 21, a cylinder head 23 provided on the cylinder 22, and a cylinder head cover 24 provided on the cylinder head 23. A clutch cover 25 that covers a clutch (not shown) from a side is attached to a right side surface of the crankcase 21. A magnet cover (not shown) that covers a magnet (not shown) from a side is attached to a left side surface of the crankcase 21. An oil pan 26 that stores oil is attached to a lower surface of the crankcase 21.

As shown in FIG. 2, left and right valve operating chambers are formed inside the cylinder head 23 and the cylinder head cover 24 for each cylinder. A variable valve device 30 is mounted in each of the left and right valve operating chambers. The variable valve device 30 is capable of changing valve lift amounts of an intake valve 35 and an exhaust valve 37 by oil pressure. The variable valve device 30 is provided with a camshaft 31 shared by an intake side and an exhaust side. A pair of partition walls (not shown) protrude from a bottom surface of the cylinder head 23 for each cylinder, and a pair of cam housings 41 are attached on the pair of partition walls. The camshaft 31 is supported in a rotatable manner by mating surfaces between the plural partition walls and the cam housings 41.

Four (only one is shown in FIG. 2) intake valves 35 are installed on a rear side of the camshaft 31, and four (only one is shown in FIG. 2) exhaust valves 37 are installed on a front side of the camshaft 31. The intake valve 35 is pressed in a valve closing direction by a valve spring 36, and the exhaust valve 37 is pressed in a valve closing direction by a valve spring 38. A low-speed cam 32, a high-speed cam 33, and an exhaust cam 34 (see FIG. 3) are formed on an outer circumferential surface of the camshaft 31. Each of the cams 32 to 34 has a plate shape in which a cam ridge protrudes from a part of a base circle, and the cam ridge of the high-speed cam 33 is higher than the cam ridge of the low-speed cam 32.

An intake-side rocker shaft 45 and an exhaust-side rocker shaft 51 are supported on upper portions of the cam housings 41. The intake-side rocker shaft 45 and the exhaust-side rocker shaft 51 are located above the camshaft 31, and the intake-side rocker shaft 45 and the exhaust-side rocker shaft 51 extend parallel to the camshaft 31. An upper housing 42 is attached to an upper portion of the cam housing 41, and a coupling piston 61 and a separation piston 63 (see FIG. 6) are accommodated in the upper housing 42. An oil control valve 71 that controls oil pressure of the variable valve device 30 is installed on a rear side of an upper surface of the cylinder head cover 24.

As shown in FIG. 3, the intake-side rocker shaft 45 is located in the rear of the camshaft 31, and the exhaust-side rocker shaft 51 is located in front of the camshaft 31. Two types of rocker arms 46*a* and 46*b* (only one for each is shown in FIG. 3) are supported in a swingable manner by the intake-side rocker shaft 45, and a rocker arm 52 (only one is shown in FIG. 3) is supported in a swingable manner by the exhaust-side rocker shaft 51. The rocker arm 46*a* on an intake side and the rocker arm 52 on an exhaust side are formed in a seesaw shape having a point of effort and a point of load, and the rocker arm 46*b* on the intake side is formed to be the point of effort of the rocker arm 46*a*.

A roller 47*a* that is in rolling contact with the low-speed cam 32 is supported in a rotatable manner at one end of the rocker arm 46*a* on the intake side, and a pair of the intake valves 35 are coupled to the other end of the rocker arm 46*a* which is bifurcated. A roller 47*b* that is in rolling contact with the high-speed cam 33 is supported in a rotatable manner at one end of the rocker arm 46*b* on the intake side, and the intake valves 35 are not coupled to the other end of the rocker arm 46*b*. A roller 53 that is in rolling contact with the exhaust cam 34 is supported in a rotatable manner at one end of the rocker arm 52 on the exhaust side, and a pair of the exhaust valves 37 are coupled to the other end of the rocker arm 52 which is bifurcated. The rocker arms 46*a* and 46*b* are formed in a manner capable of being coupled to each other.

When an engine rotates at a low-speed and a medium speed, the rocker arms 46*a* and 46*b* are not coupled. Therefore, the rocker arm 46*a* is swung by the low-speed cam 32, and the rocker arm 46*b* is swung by the high-speed cam 33. Since the pair of intake valves 35 are coupled to the rocker arm 46*a*, the pair of intake valves 35 are moved in response to rotation of the low-speed cam 32. Since the cam ridge of the low-speed cam 32 is small, valve lift amounts of the pair of intake valves 35 are small. Since the intake valves 35 are not coupled to the rocker arm 46*b*, the rocker arm 46*b* is idle in response to rotation of the high-speed cam 33.

When the engine rotates at a high-speed, the rocker arms 46*a* and 46*b* are coupled to each other. Therefore, the rocker arms 46*a* and 46*b* are swung integrally by the high-speed cam 33. Since the pair of intake valves 35 are coupled to the rocker arm 46*b* via the rocker arm 46*a*, the pair of intake valves 35 are moved in response to rotation of the high-speed cam 33. Since the cam ridge of the high-speed cam 33 is large, valve lift amounts of the pair of intake valves 35 are large. In this manner, the low-speed cam 32 and the high-speed cam 33 that move the intake valves 35 are switched by switching a coupling state of the rocker arms 46*a* and 46*b*.

The variable valve device 30 includes a switching mechanism 55 that switches between a coupling state and a separation state of the rocker arms 46*a* and 46*b* by oil pressure. The switching mechanism 55 includes a coupling pin 56 installed in a storage hole of the rocker arm 46*b* and a return pin 58 installed in a storage hole of the rocker arm 46*a*. The switching mechanism 55 includes the coupling piston 61 that is in contact with the coupling pin 56 from one side in a left-right direction, and the separation piston 63 that is in contact with the return pin 58 from the other side in the left-right direction. The coupling piston 61 and the separation piston 63 can be moved forward and backward by oil pressure.

In the variable valve device 30, when oil is supplied from the oil control valve 71 to the coupling piston 61, the oil is discharged from the separation piston 63 to the oil control valve 71. The coupling piston 61 is moved forward so as to approach the rocker arm 46*b*, and the separation piston 63 is moved backward so as to separate from the rocker arm 46*a*. As the coupling piston 61 is moved forward and the separation piston 63 is moved backward, the return pin 58 is pushed by the coupling pin 56, and a part of the coupling pin 56 enters the storage hole of the rocker arm 46*a* from the storage hole of the rocker arm 46*b* to couple the rocker arms 46*a* and 46*b*.

In the variable valve device 30, when oil is supplied from the oil control valve 71 to the separation piston 63, the oil is discharged from the coupling piston 61 to the oil control valve 71. The separation piston 63 is moved forward so as to approach the rocker arm 46*a*, and the coupling piston 61 is moved backward so as to separate from the rocker arm 46*b*. As the separation piston 63 is moved forward and the coupling piston 61 is moved backward, the coupling pin 56 is pushed back by the return pin 58, and a part of the coupling pin 56 is pulled out of the storage hole of the rocker arm 46*a* to separate the rocker arms 46*a* and 46*b*.

Figure 4A:
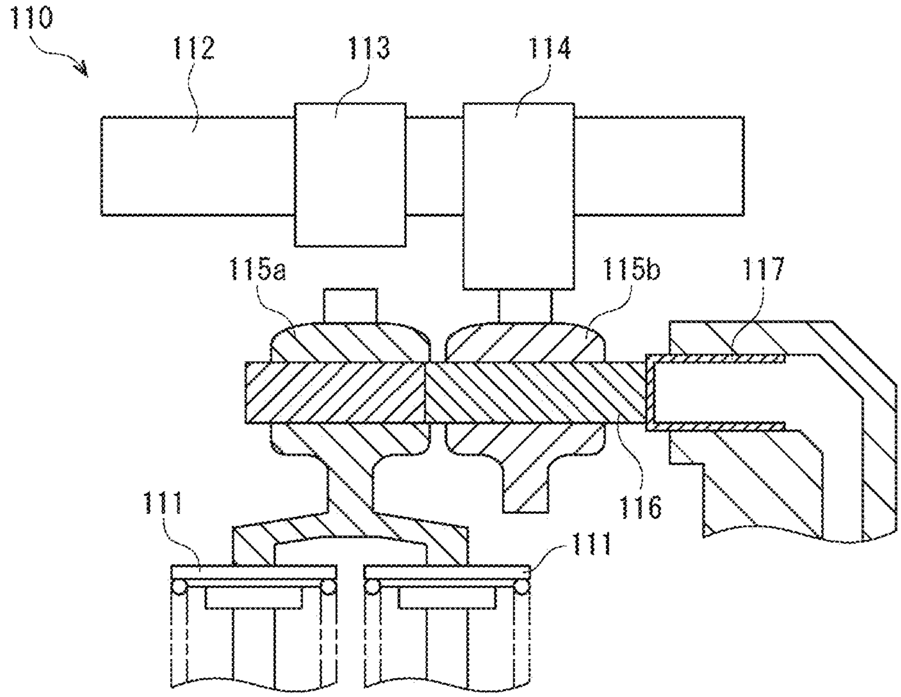
FIG. 4A RELATED ART
FIGS. 4A and 4B show an example of a cam switching operation of a variable valve device according to Comparative Example 1.
Figure 4B:
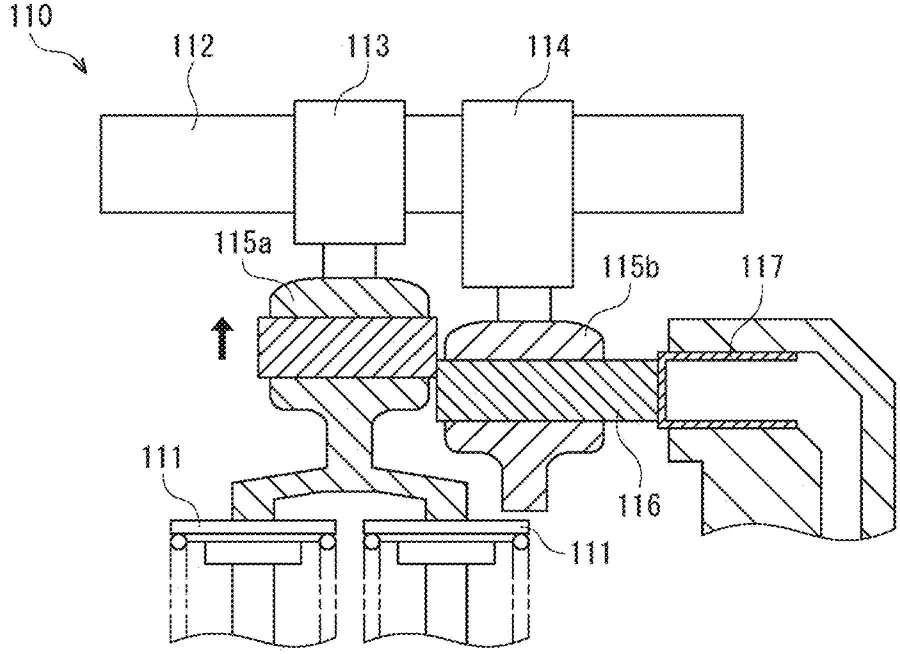
FIG. 4B RELATED ART

As shown in FIG. 4A, in a variable valve device 110 according to Comparative Example 1, a coupling pin 116 is moved by a hydraulic piston 117 regardless of a valve lift. In a case where a low-speed cam 113 is switched to a high-speed cam 114, when the coupling pin 116 protrudes out of a storage hole of a rocker arm 115*b* immediately before a valve lift of an intake valve 111, insertion of the coupling pin 116 into a storage hole of a rocker arm 115*a* is shallow. As shown in FIG. 4B, when the coupling pin 116 is pulled out of the storage hole of the rocker arm 115*a* during a valve lift by the high-speed cam 114, the rocker arm 115*a* may collide with the low-speed cam 113 to generate abnormal noises, and durability of the variable valve device 110 may be reduced. When the coupling pin 116 is pulled out of the storage hole of the rocker arm 115*a*, an opening of the storage hole may be worn out.

Figure 5A:
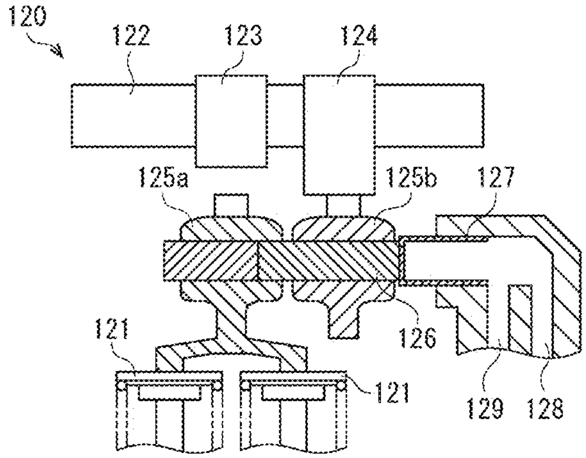
FIG. 5A RELATED ART
FIGS. 5A, 5B, and 5C show an example of a cam switching operation of a variable valve device according to Comparative Example 2.

As shown in FIG. 5A, at the time of switching from a low-speed cam 123 to a high-speed cam 124, oil may be supplied from an actuation passage 128 to a hydraulic piston 127 in a predetermined period after a valve lift ends. Accordingly, a coupling operation of a pair of rocker arms 125*a* and 125*b* is not hindered by a valve lift. However, since only the actuation passage 128 is used, oil is intermittently supplied, so that the coupling state between the pair of rocker arms 125*a* and 125*b* is not stable. Therefore, a direct passage 129 that is opened after the oil is supplied from the actuation passage 128 is provided, and the oil is supplied from the direct passage 129 to the hydraulic piston 127, thereby stabilizing the coupling state.

Figure 5B:
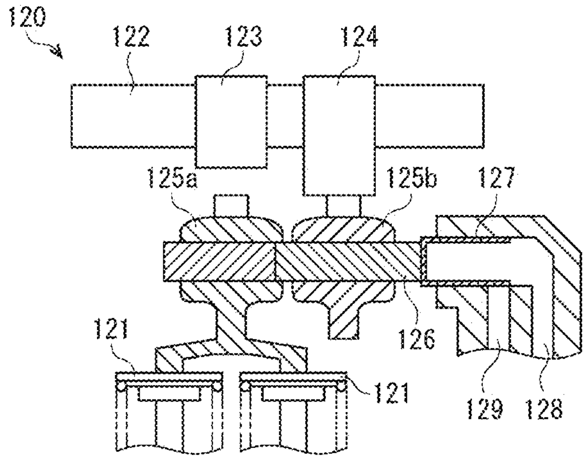
FIG. 5B RELATED ART
Figure 5C:
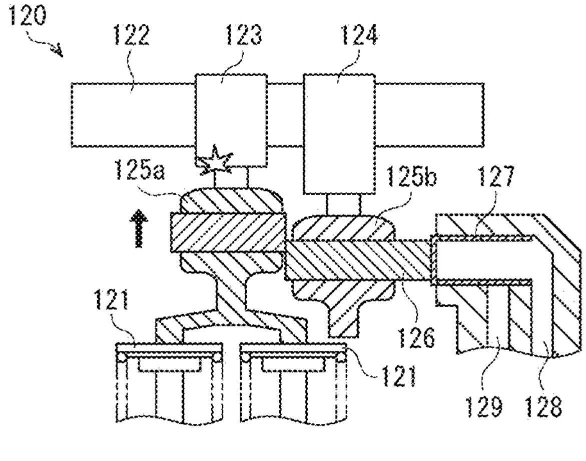
FIG. 5C RELATED ART

However, as shown in FIG. 5B, the high-speed cam 124 is switched to the low-speed cam 123 at any timing. Therefore, a valve lift may be restarted before a coupling pin 126 is pulled out of a storage hole of the rocker arm 125*a*. As shown in FIG. 5C, when the coupling pin 126 is pulled out of the storage hole of the rocker arm 125*a* during a valve lift, there are various problems such as generation of abnormal noises as described above. Accordingly, the variable valve device 30 according to the present embodiment is configured such that not only the switching from the low-speed cam 32 to the high-speed cam 33 but also the switching from the high-speed cam 33 to the low-speed cam 32 are performed after a valve lift ends and before a subsequent valve lift starts.

Figure 6:
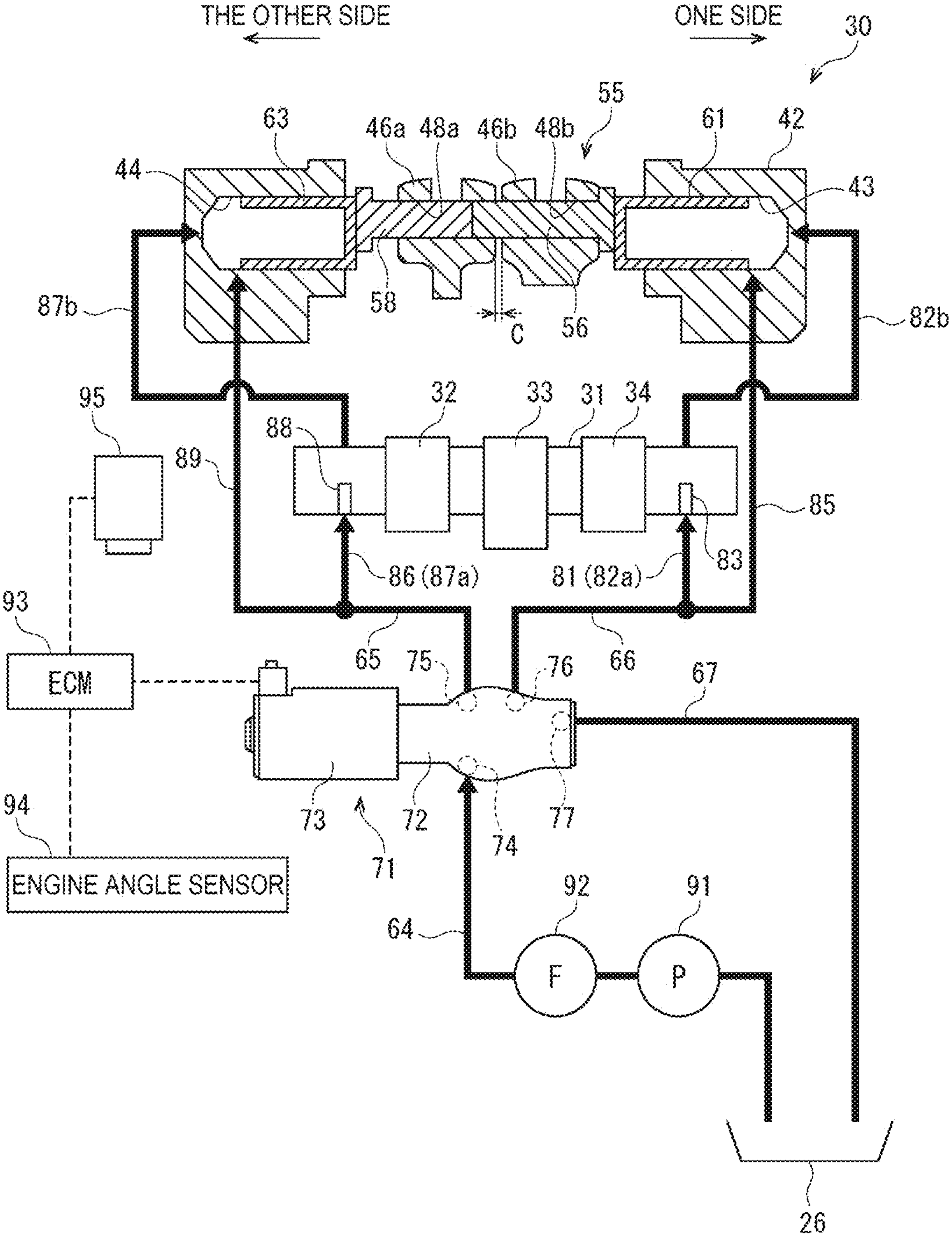
FIG. 6 is a schematic view showing the variable valve device according to the present embodiment.
Figure 7:
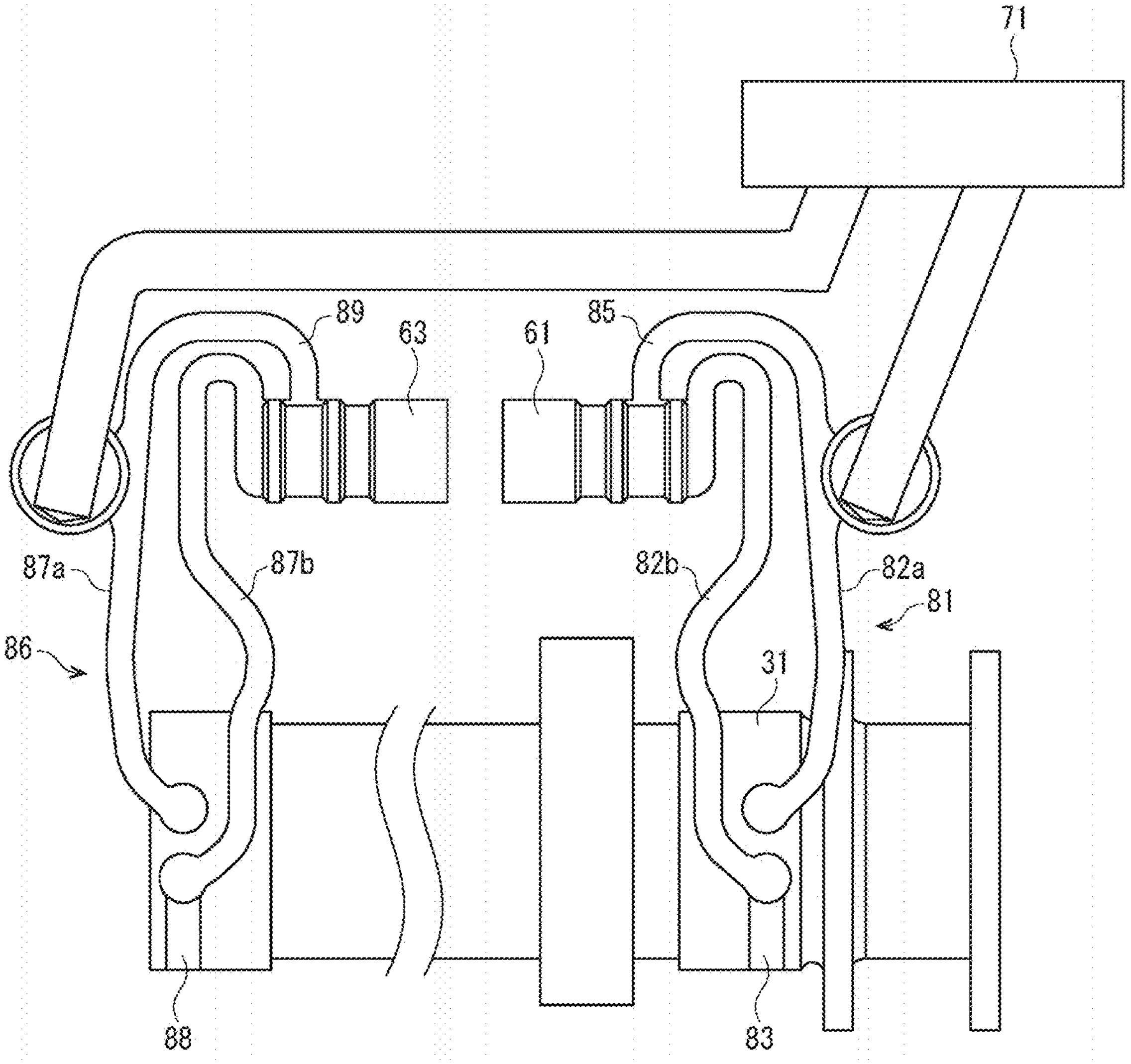
FIG. 7 is a schematic view showing actuation passages and direct passages according to the present embodiment.
Figure 7:
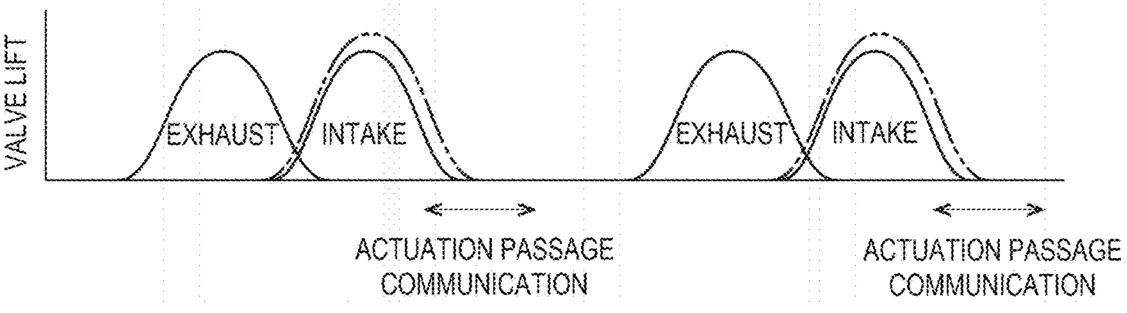

Hereinafter, the variable valve device according to the present embodiment will be described with reference to FIGS. 6 and 7. FIG. 6 is a schematic diagram showing the variable valve device according to the present embodiment. FIG. 7 is a schematic view showing actuation passages and direct passages according to the present embodiment.

As shown in FIG. 6, in the variable valve device 30, an oil supply path 64 extends from the oil pan 26 toward the oil control valve 71. Oil is pumped up from the oil pan 26 by an oil pump 91 provided in an intermediate portion of the oil supply path 64, and the oil is supplied to the oil control valve 71 through an oil filter 92. The oil control valve 71 includes a valve housing 72 that accommodates a valve spool (not shown), and a solenoid 73 that moves the valve spool forward and backward. The valve spool is moved forward and backward by the solenoid 73 to switch an oil passage in the oil control valve 71.

An input port 74, a separation port 75, a coupling port 76, and a drain port 77 are formed in the valve housing 72. The oil supply path 64 communicates with the input port 74, a separation passage 65 communicates with the separation port 75, a coupling passage 66 communicates with the coupling port 76, and a drain passage 67 communicates with the drain port 77. The separation passage 65 extends toward the separation piston 63 to control the separation piston 63. The coupling passage 66 extends toward the coupling piston 61 to control the coupling piston 61. The drain passage 67 extends from the oil control valve 71 to a position above the oil pan 26, and oil is dropped from an outlet of the drain passage 67 to the oil pan 26.

By moving the valve spool of the oil control valve 71, the input port 74 communicates with one of the separation port 75 and the coupling port 76, and the drain port 77 communicates with the other one of the separation port 75 and the coupling port 76. Oil is output from the oil control valve 71 to one of the separation passage 65 and the coupling passage 66, and remaining oil is discharged from the other one of the separation passage 65 and the coupling passage 66 to the oil control valve 71 (the drain passage 67). In this manner, oil pressure applied to the switching mechanism 55 is controlled by the oil control valve 71.

The variable valve device 30 includes a single oil control valve 71, and the coupling piston 61 and the separation piston 63 are controlled by the single oil control valve 71. Since the oil control valve 71 is used for actuating the coupling piston 61 and the separation piston 63, the number of components is reduced, and the variable valve device 30 is formed in a compact manner. By changing a communication destination of each port in the oil control valve 71, it is possible to smoothly switch between coupling and separation of the rocker arms 46*a* and 46*b* by moving one of the coupling piston 61 and the separation piston 63 forward and moving the other one backward.

The coupling passage 66 is divided into a coupling actuation passage (a first coupling oil passage) 81 and a coupling direct passage (a second coupling oil passage) 85. Both the coupling actuation passage 81 and the coupling direct passage 85 extend from the oil control valve 71 to the coupling piston 61 of the switching mechanism 55. A part of the coupling actuation passage 81 is formed by a coupling oil groove 83 through which oil is allowed to pass at a predetermined rotation phase of the camshaft 31. As described above, the low-speed cam 32, the high-speed cam 33, and the exhaust cam 34 are formed on the camshaft 31, and the coupling oil groove 83 is formed in a part of an outer circumferential surface of the camshaft 31 on a side closer to the one side than the exhaust cam 34.

The coupling actuation passage 81 is divided into an upstream passage 82*a* and a downstream passage 82*b* with the coupling oil groove oil groove 83 of the camshaft 31 interposed therebetween. By rotating the camshaft 31, communication and separation between the upstream passage 82*a* and the downstream passage 82*b* of the coupling actuation passage 81 are alternately repeated. Therefore, oil is intermittently supplied from the oil control valve 71 to the coupling piston 61, and oil is intermittently discharged from the coupling piston 61 to the oil control valve 71. The predetermined rotation phase of the camshaft 31 is set from an end timing of a valve lift to a timing before the start of a subsequent valve lift.

The coupling direct passage 85 directly extends from the oil control valve 71 to the coupling piston 61 without passing through the coupling oil groove 83 of the camshaft 31. Therefore, oil is continuously supplied from the oil control valve 71 to the coupling piston 61 through the coupling direct passage 85, and oil is continuously discharged from the coupling piston 61 to the oil control valve 71 through the coupling direct passage 85. The coupling direct passage 85 is opened and closed by the coupling piston 61. The coupling direct passage 85 is opened during forward movement of the coupling piston 61, and the coupling direct passage 85 is closed during backward movement of the coupling piston 61.

The separation passage 65 is divided into a separation actuation passage (a first separation oil passage) 86 and a separation direct passage (a second separation oil passage) 89. Both the separation actuation passage 86 and the separation direct passage 89 extend from the oil control valve 71 to the separation piston 63 of the switching mechanism 55. A part of the separation actuation passage 86 is formed by a separation oil groove 88 through which oil is allowed to pass at a predetermined rotation phase of the camshaft 31. Similar to the coupling oil groove 83 on a side closer to the one side than the exhaust cam 34, the separation oil groove 88 is formed in a part of the outer circumferential surface of the camshaft 31 on a side closer to the other side than the low-speed cam 32.

The separation actuation passage 86 is divided into an upstream passage **87*a* and a downstream passage 87*b* with the separation oil groove 88 of the camshaft 31 interposed therebetween. By rotating the camshaft 31, communication and separation between the upstream passage 87*a* and the downstream passage 87*b* of the separation actuation passage 86 are alternately repeated. Therefore, oil is intermittently supplied from the oil control valve 71 to the separation piston 63, and oil is intermittently discharged from the separation piston 63 to the oil control valve 71. For the separation oil groove 88, a predetermined rotation phase of the camshaft 31** is also set from an end timing of a valve lift to a timing before the start of a subsequent valve lift.

The separation direct passage 89 directly extends from the oil control valve 71 to the separation piston 63 without passing through the separation oil groove 88 of the camshaft 31. Therefore, oil is continuously supplied from the oil control valve 71 to the separation piston 63 through the separation direct passage 89, and oil is continuously discharged from the separation piston 63 to the oil control valve 71 through the separation direct passage 89. The separation direct passage 89 is opened and closed by the separation piston 63. The separation direct passage 89 is opened during forward movement of the separation piston 63, and the separation direct passage 89 is closed during backward movement of the separation piston 63.

As details will be described later, the coupling piston 61 is moved in response to oil supply through the coupling actuation passage 81 as a trigger, and the coupling piston 61 is maintained in a state in which the coupling piston 61 is pushed by oil supply through the coupling direct passage 85. The separation piston 63 is moved in response to oil supply through the separation actuation passage 86 as a trigger, and the separation piston 63 is maintained in a state in which the separation piston 63 is pushed by oil supply through the separation direct passage 89.

As described above, the rocker arms **46*a* and 46*b* are adjacent to each other, and upper portions of the rocker arms 46*a* and 46*b* are adjacent to each other with a slight gap C therebetween. Storage holes 48*a* and 48*b* parallel to the camshaft 31 are formed in the upper portions of the rocker arms 46*a* and 46*b*. Hole diameters of the storage hole 48*a* of the rocker arm 46*a* and the storage hole 48*b* of the rocker arm 46*b* match with each other, and the storage holes 48*a* and 48*b* are coaxially formed such that the storage holes 48*a* and 48*b* communicate with each other in a state in which the rocker arm 46*a* is not lifted up. The coupling pin 56 is installed in the storage hole 48*b* of the rocker arm 46*b*, and the return pin 58 is installed in the storage hole 48*a* of the rocker arm 46*a*. A tip end of the return pin 58 is in contact with a tip end of the coupling pin 56**.

A sliding chamber 43 is formed in the upper housing 42 on a side closer to the one side than the rocker arm **46*b*. The coupling piston 61 is installed in the sliding chamber 43. A pressing surface of the coupling piston 61 is in contact with the coupling pin 56, and the coupling pin 56 is moved to the other side by the coupling piston 61. A sliding chamber 44 is formed in the upper housing 42 on a side closer to the other side than the rocker arm 46*a*. The separation piston 63 is installed in the sliding chamber 44. A pressing surface of the separation piston 63 is in contact with the return pin 58, and the return pin 58 is returned to the one side by the separation piston 63. The separation piston 63** is provided with a sensing arm (not shown).

The switching mechanism 55 switches the coupling state of the rocker arms **46*a* and 46*b* by moving the coupling pin 56 by oil pressure. As described above, in the separation state of the rocker arms 46*a* and 46*b*, the pair of intake valves 35 are operated by the low-speed cam 32 via the rocker arms 46*a*. In the coupling state of the rocker arms 46*a* and 46*b*, the pair of intake valves 35 are operated by the high-speed cam 33 via the rocker arms 46*a* and 46*b*. In this manner, the switching mechanism 55 switches cams that move the pair of intake valves 35 by switching the coupling state of the rocker arms 46*a* and 46*b* by the coupling pin 56**.

In the switching mechanism 55, the coupling piston 61 and the separation piston 63 are installed along the same straight line, and the coupling pin 56 and the return pin 58 are installed along the same straight line at positions eccentric from center lines of the coupling piston 61 and the separation piston 63. The coupling actuation passage 81 and the separation actuation passage 86 are formed symmetrically across the rocker arms **46*a* and 46*b*, and the coupling direct passage 85 and the separation direct passage 89 are formed symmetrically across the rocker arms 46*a* and 46*b*. With such a configuration, even when the coupling piston 61 and the separation piston 63 are provided in the switching mechanism 55, the variable valve device 30** can be formed in a compact manner.

The variable valve device 30 includes an engine control module (ECM) 93, an engine angle sensor 94, and a switching sensor 95. The engine angle sensor 94 detects an engine rotation speed, when the engine rotation speed is a predetermined rotation speed or more, the ECM 93 outputs a coupling command signal to the solenoid 73, and when the engine rotation speed is less than the predetermined rotation speed, the ECM 93 outputs a release command signal to the solenoid 73. The switching sensor 95 detects switching between the coupling state and the separation state of the rocker arms **46*a* and 46*b* based on movement of a tip end of a sensing arm of the separation piston 63. A failure of the variable valve device 30 such as a defective switching operation can be determined by comparing a command signal from the ECM 93 and a detection signal from the switching sensor 95**.

As shown in FIG. 7, the upstream passage **82*a* of the coupling actuation passage 81 extends from the oil control valve 71 to the camshaft 31, and the downstream passage 82***b* of the coupling actuation passage 81 extends from the camshaft 31 to the coupling piston 61. A downstream end of the upstream passage 82*a* and an upstream end of the downstream passage 82*b* are positioned on the same circumference on the outer circumferential surface of the camshaft 31. The coupling oil groove 83 is formed in a circumferential direction on the circumference of the outer circumferential surface of the camshaft 31. The coupling direct passage 85 extends from the oil control valve 71 to the coupling piston 61, and the coupling direct passage 85 is formed to be shorter than the coupling actuation passage 81.

When oil is supplied to the coupling piston 61, the oil is allowed to pass through the coupling actuation passage 81 only in a period in which the upstream passage 82*a* and the downstream passage 82*b* communicate with each other via the coupling oil groove 83. The coupling oil groove 83 is formed such that the upstream passage 82*a* and the downstream passage 82*b* communicate with each other at an end timing of a valve lift, and the upstream passage 82*a* and the downstream passage 82*b* are separated from each other before a valve lift starts. That is, the coupling oil groove 83 is formed in the camshaft 31 such that oil is supplied to the coupling piston 61 and oil is discharged from the coupling piston 61 by allowing the oil to pass through the coupling oil groove 83 at a predetermined rotation phase avoiding a valve lift.

The upstream passage 87*a* of the separation actuation passage 86 extends from the oil control valve 71 to the camshaft 31, and the downstream passage 87*b* of the separation actuation passage 86 extends from the camshaft 31 to the separation piston 63. A downstream end of the upstream passage 87*a* and an upstream end of the downstream passage 87*b* are positioned on the same circumference on the outer circumferential surface of the camshaft 31. The separation oil groove 88 is formed in the circumferential direction on the circumference of the outer circumferential surface of the camshaft 31. The separation direct passage 89 extends from the oil control valve 71 to the separation piston 63, and the separation direct passage 89 is formed to be shorter than the separation actuation passage 86.

When oil is supplied to the separation piston 63, the oil is allowed to pass through the separation actuation passage 86 only in a period in which the upstream passage 87*a* and the downstream passage 87*b* communicate with each other via the separation oil groove 88. The separation oil groove 88 is formed such that the upstream passage 87*a* and the downstream passage 87*b* communicate with each other at an end timing of a valve lift, and the upstream passage 87*a* and the downstream passage 87*b* are separated from each other before a valve lift starts. That is, the separation oil groove 88 is formed in the camshaft 31 such that oil is supplied to the separation piston 63 and oil is discharged from the separation piston 63 by allowing the oil to pass through the separation oil groove 88 at a predetermined rotation phase avoiding a valve lift.

When the rocker arms 46*a* and 46*b* are coupled to each other, oil starts to be supplied to the coupling piston 61 and oil starts to be discharged from the separation piston 63 at an end timing of a valve lift. The coupling operation of the rocker arms 46*a* and 46*b* ends before a valve lift starts, and the rocker arms 46*a* and 46*b* are not coupled in the middle of a valve lift. After the oil is supplied from the coupling actuation passage 81 to the coupling piston 61, the oil is supplied from the coupling direct passage 85 to the coupling piston 61. Although the coupling piston 61 may be moved by intermittent oil supply through the coupling actuation passage 81 only, the coupling piston 61 is stably held by oil supply through the coupling direct passage 85.

When the rocker arms 46*a* and 46*b* are separated from each other, oil starts to be supplied to the separation piston 63 and oil starts to be discharged from the coupling piston 61 at an end timing of a valve lift. The separation operation of the rocker arms 46*a* and 46*b* is completed before a valve lift starts, and the rocker arms 46*a* and 46*b* are not separated in the middle of a valve lift. After the oil is supplied from the separation actuation passage 86 to the separation piston 63, the oil is supplied from the separation direct passage 89 to the separation piston 63. Although the separation piston 63 may be moved by intermittent oil supply from the separation actuation passage 86 only, the separation piston 63 is stably held by oil supply through the separation direct passage 89.

Figure 8A:
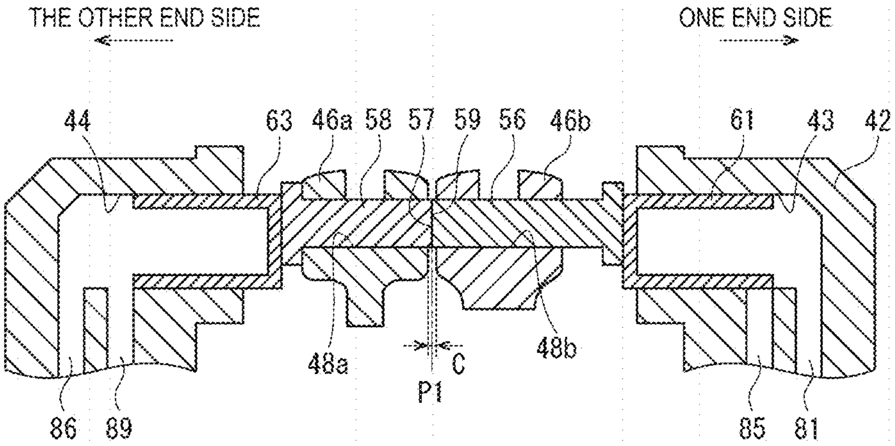
FIGS. 8A, 8B, and 8C are views showing a coupling operation of the variable valve device according to the present embodiment.
Figure 8B:
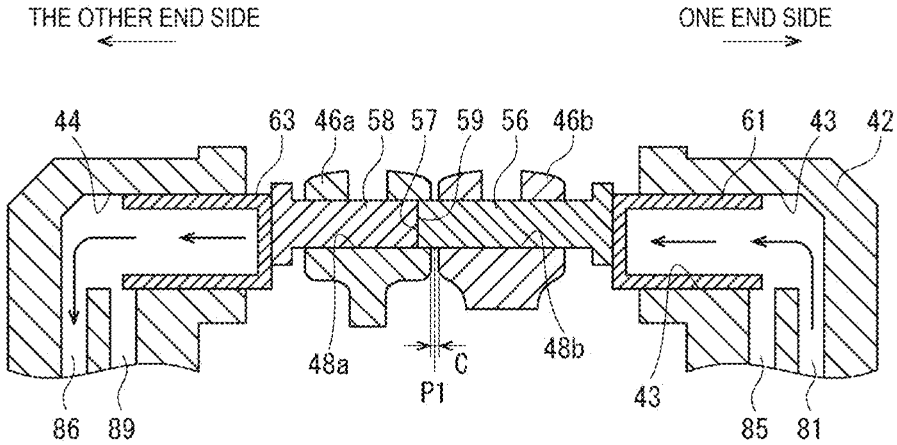
Figure 8C:
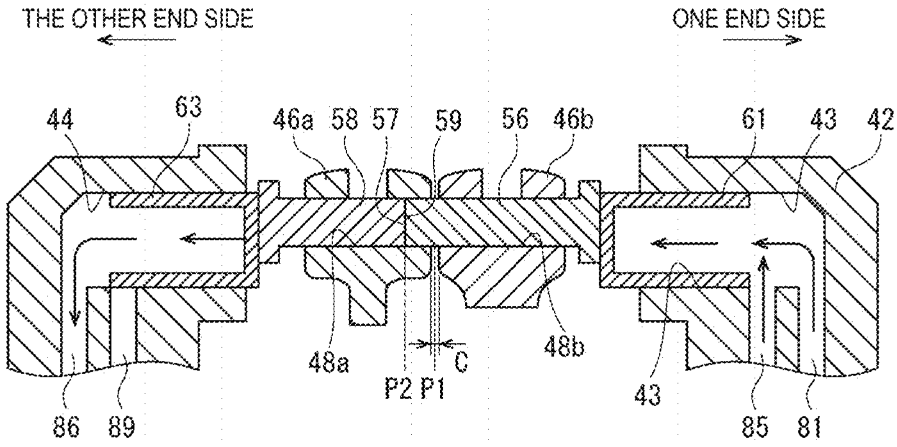
Figure 9A:
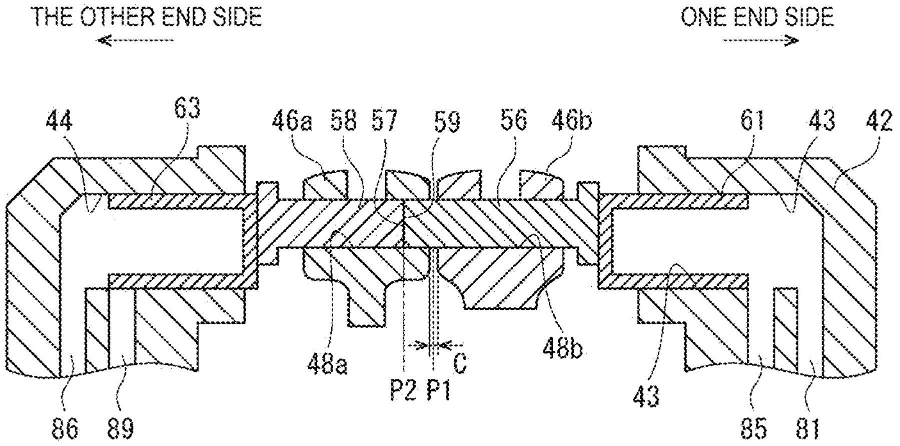
FIGS. 9A, 9B, and 9C are views showing a separation operation of the variable valve device according to the present embodiment.
Figure 9B:
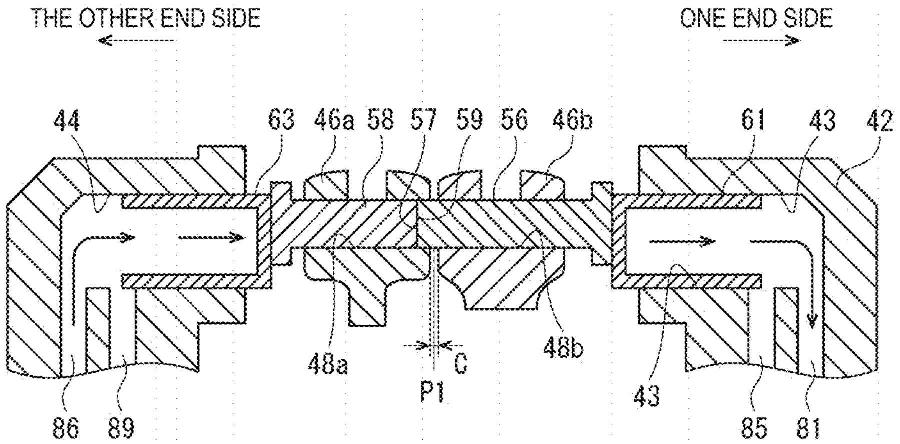
Figure 9C:
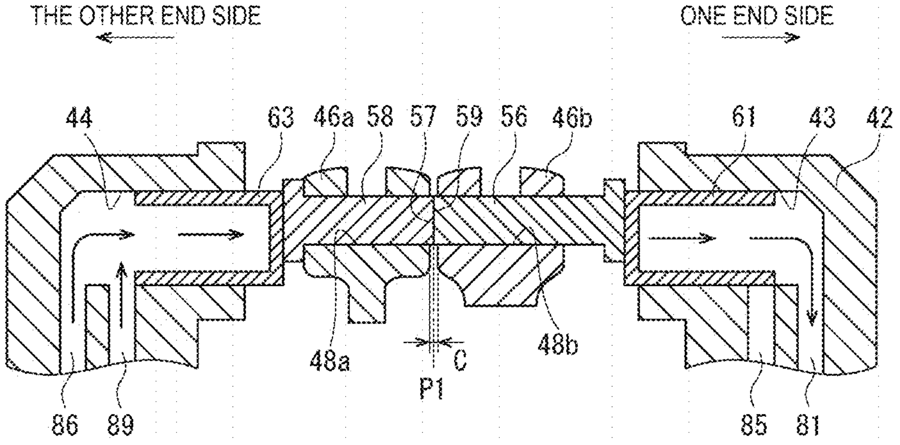

A coupling operation and a separation operation of the variable valve device will be described with reference to FIGS. 8A to 9C. FIGS. 8A, 8B, and 8C are views showing the coupling operation of the variable valve device according to the present embodiment. FIGS. 9A, 9B, and 9C are views showing the separation operation of the variable valve device according to the present embodiment. In FIGS. 8A to 9C, reference numerals in FIG. 6 are used as appropriate for convenience of description.

As shown in FIG. 8A, the coupling piston 61 is installed in the cylindrical sliding chamber 43 of the upper housing 42. The downstream end of the coupling actuation passage 81 (the downstream passage 82*b*) is opened in a back surface of the sliding chamber 43, and the downstream end of the coupling direct passage 85 is opened in an inner circumferential surface of the sliding chamber 43. A supply direction of the oil from the coupling actuation passage 81 to the coupling piston 61 is directed to a forward and backward direction of the coupling piston 61, and a supply direction of the oil from the coupling direct passage 85 to the coupling piston 61 is directed to a radial direction of the coupling piston 61. During a low-speed operation, the coupling piston 61 is moved backward, and the downstream end of the coupling direct passage 85 is closed by the outer circumferential surface of the coupling piston 61.

The separation piston 63 is installed in the cylindrical sliding chamber 44 of the upper housing 42. The downstream end of the separation actuation passage 86 (the downstream passage 87*b*) is opened in a back surface of the sliding chamber 44, and the downstream end of the separation direct passage 89 is opened in an inner circumferential surface of the sliding chamber 44. A supply direction of the oil from the separation actuation passage 86 to the separation piston 63 is directed to a forward and backward direction of the separation piston 63, and a supply direction of the oil from the separation direct passage 89 to the separation piston 63 is directed to a radial direction of the separation piston 63. During a low-speed operation, the separation piston 63 is moved forward, and the downstream end of the separation direct passage 89 is opened by an outer circumferential surface of the separation piston 63.

During the low-speed operation, the separation piston 63 is moved forward, and the coupling piston 61 is moved backward. The coupling pin 56 is pushed by the return pin 58 along the forward movement of the separation piston 63 and the backward movement of the coupling piston 61. A flange of the return pin 58 abuts against the rocker arm 46*a*, and the return pin 58 is positioned at an initial position. At this time, a tip end 57 of the coupling pin 56 is in contact with a tip end 59 of the return pin 58 at a separation position P1 in the gap C between the rocker arms 46*a* and 46*b*. The tip end 57 of the coupling pin 56 is positioned in the gap C between the rocker arms 46*a* and 46*b*, and the rocker arms 46*a* and 46*b* are separated from each other.

When switching from the low-speed operation to a high-speed operation is started, oil starts to be supplied from the oil control valve 71 to the coupling piston 61, and oil starts to be discharged from the separation piston 63 to the oil control valve 71. At this time, the oil is supplied to the coupling piston 61 while the upstream passage 82*a* and the downstream passage 82*b* communicate with each other via the coupling oil groove 83 of the camshaft 31, that is, at a predetermined rotation phase of the camshaft 31 avoiding a valve lift. When oil pressure acts on the coupling piston 61, the coupling piston 61 is moved forward, and when oil pressure is released from the separation piston 63, the separation piston 63 is moved backward, and the coupling pin 56 is pushed by the coupling piston 61.

As shown in FIG. 8B, in an initial stage of the switching from the low-speed operation to the high-speed operation, the return pin 58 is pushed out by the coupling pin 56 along the forward movement of the coupling piston 61, and a part of the coupling pin 56 starts to enter the storage hole 48*a* of the rocker arm 46*a*. At this time, the coupling pin 56 shallowly enters the storage hole 48*a* of the rocker arm 46*a*, and the rocker arms 46*a* and 46*b* are not completely coupled to each other. Since a valve lift of the intake valve 35 does not occur, the coupling pin 56 is not pulled out from the rocker arm 46*a* due to a valve lift during the coupling of the rocker arms 46*a* and 46*b*.

As shown in FIG. 8C, after the switching to the high-speed operation, the coupling piston 61 is pushed to a maximum stroke position by the oil pressure. The tip end 57 of the coupling pin 56 is positioned at a coupling position P2 of the rocker arm 46*a*. A part of the coupling pin 56 deeply enters the storage hole 48*a* of the rocker arm 46*a*, and the rocker arms 46*a* and 46*b* are coupled to each other via the coupling pin 56. The downstream end of the coupling direct passage 85 is opened along the forward movement of the coupling piston 61, and the coupling piston 61 is held at a forward position by oil supply from the coupling direct passage 85, so that the coupling state of the rocker arms 46*a* and 46*b* is maintained.

As shown in FIG. 9A, when switching from the high-speed operation to the low-speed operation is started, oil starts to be supplied from the oil control valve 71 to the separation piston 63, and oil starts to be discharged from the coupling piston 61 to the oil control valve 71. At this time, the oil is supplied to the separation piston 63 while the upstream passage 87*a* and the downstream passage 87*b* communicate with each other via the separation oil groove 88 of the camshaft 31, that is, at a predetermined rotation phase of the camshaft 31 avoiding a valve lift. When oil pressure acts on the separation piston 63, the separation piston 63 is moved forward, and when oil pressure is released from the coupling piston 61, the coupling piston 61 is moved backward, and the coupling pin 56 is pushed back by the separation piston 63 via the return pin 58.

As shown in FIG. 9B, in an initial stage of the switching from the high-speed operation to the low-speed operation, the coupling pin 56 is pushed back by the return pin 58 along the forward movement of the separation piston 63, and a part of the coupling pin 56 starts to be pulled out of the storage hole 48*a* of the rocker arm 46*a*. At this time, the coupling pin 56 shallowly enters the storage hole 48*a* of the rocker arm 46*a*, and the rocker arms 46*a* and 46*b* are not completely separated from each other. Since a valve lift of the intake valve 35 does not occur, the coupling pin 56 is not pulled out from the rocker arm 46*a* due to a valve lift during the separation of the rocker arms 46*a* and 46*b*.

As shown in FIG. 9C, after the switching to the low-speed operation, the coupling piston 61 is pushed back to a minimum stroke position by the separation piston 63. As the coupling piston 61 is moved backward, the tip end 57 of the coupling pin 56 is positioned at the separation position P1 of the rocker arm 46*a*. The coupling pin 56 is completely pulled out of the storage hole 48*a* of the rocker arm 46*a*, and the rocker arms 46*a* and 46*b* are separated from each other. Further, the downstream end of the separation direct passage 89 is opened along the forward movement of the separation piston 63, and the coupling piston 61 is held at a backward position by the separation piston 63 that receives oil pressure in the separation direct passage 89, so that the separation state of the rocker arms 46*a* and 46*b* is maintained.

As described above, according to the variable valve device 30 of the present embodiment, when the oil is supplied from the oil control valve 71 to the coupling piston 61, the coupling piston 61 is moved forward at the predetermined rotation phase of the camshaft 31 avoiding a valve lift, so that coupling of the rocker arms 46*a* and 46*b* is not hindered by a valve lift. When oil is supplied from the oil control valve 71 to the separation piston 63, the separation piston 63 is moved forward at the predetermined rotation phase of the camshaft 31 avoiding a valve lift, so that separation of the rocker arms 46*a* and 46*b* is not hindered by a valve lift.

Although a single oil control valve is provided in the variable valve device in the present embodiment, an oil control valve for the coupling piston and an oil control valve for the separation piston may be separately provided in the variable valve device.

In the present embodiment, the end timing of a valve lift is not limited to a timing when the valve lift completely ends, and may include a timing immediately before an end when a valve lift can be regarded as being ended.

Although oil starts to be supplied from the oil control valve to the switching mechanism at the end timing of a valve lift in the present embodiment, a supply timing of the oil is not limited to the end timing of a valve lift. The oil may start to be supplied from the oil control valve to the switching mechanism in a zero range where no valve lift occurs. With such a configuration, a switching operation of a cam can also be prevented from being hindered by a valve lift.

Although a pair of rocker arms are provided on an intake side of the variable valve device in the present embodiment, a plurality of rocker arms may be provided on the intake side of the variable valve device. For example, three or more rocker arms may be provided on the intake side of the variable valve device.

Although a seesaw type rocker arm is described as an example in the present embodiment, the type of the rocker arm is not particularly limited, and a finger follower type rocker arm may be used.

Although a plurality of rocker arms are adjacent to one another in the present embodiment, the plurality of rocker arms may be separated from one another.

The variable valve device according to the present embodiment is not limited to being used in an engine of the straddle-type vehicle described above, and may be used in an engine of another type of vehicle. The straddle-type vehicle is not limited to a motorcycle, and may be any vehicle on which an engine is mounted. The straddle-type vehicle is not limited to a general vehicle in which a driver rides on a seat in a posture straddling the seat, and includes a scooter-type vehicle in which a driver rides on a seat without straddling the seat.

As described above, according to a first aspect, there is provided a variable valve device (30) configured to change a valve lift amount in a cylinder head (23). The variable valve device includes: a camshaft (31) formed with a plurality of cams (the low-speed cam 32 and the high-speed cam 33) having different valve lift amounts; a plurality of rocker arms (46*a* and 46*b*) configured to be in contact with the plurality of cams and move a valve (the intake valve 35); a switching mechanism (55) configured to couple and separate the plurality of rocker arms by oil pressure; and an oil control valve (71) configured to control the oil pressure applied to the switching mechanism. The switching mechanism includes a coupling piston (61) and a separation piston (63) configured to be moved forward and backward by the oil pressure, the plurality of rocker arms are coupled to one another along forward movement of the coupling piston, the plurality of rocker arms are separated from one another along forward movement of the separation piston, and the oil control valve is configured to move the coupling piston forward at a predetermined rotation phase of the camshaft, and to move the separation piston forward at a predetermined rotation phase of the camshaft. According to this configuration, when oil is supplied from the oil control valve to the coupling piston, the coupling piston is moved forward at the predetermined rotation phase of the camshaft avoiding a valve lift, so that coupling of the plurality of rocker arms is not hindered by a valve lift. When the oil is supplied from the oil control valve to the separation piston, the separation piston is moved forward at the predetermined rotation phase of the camshaft avoiding a valve lift, so that separation of the plurality of rocker arms is not hindered by a valve lift.

According to a second aspect, in the first aspect, the plurality of rocker arms are coupled to one another along the forward movement of the coupling piston and backward movement of the separation piston, the plurality of rocker arms are separated from one another along the forward movement of the separation piston and backward movement of the coupling piston, a first coupling oil passage (the coupling actuation passage 81) and a second coupling oil passage (the coupling direct passage 85) extend from the oil control valve to the coupling piston, a first separation oil passage (the separation actuation passage 86) and a second separation oil passage (the separation direct passage 89) extend from the oil control valve to the separation piston, a part of the first coupling oil passage is formed by a coupling oil groove (83) through which oil is allowed to pass at the predetermined rotation phase of the camshaft, and a part of the first separation oil passage is formed by a separation oil groove (88) through which oil is allowed to pass at the predetermined rotation phase of the camshaft, the second coupling oil passage is opened during the forward movement of the coupling piston and is closed during the backward movement of the coupling piston, the second separation oil passage is opened during the forward movement of the separation piston and is closed during the backward movement of the separation piston, the oil control valve is configured to supply oil to the coupling piston and discharge oil from the separation piston to move the coupling piston forward and move the separation piston backward at the predetermined rotation phase of the camshaft, and the oil control valve is configured to supply oil to the separation piston and discharge oil from the coupling piston to move the separation piston forward and move the coupling piston backward at the predetermined rotation phase of the camshaft. According to this configuration, when oil is supplied from the oil control valve to the coupling piston, the oil is supplied to the coupling piston through the coupling oil groove at the predetermined rotation phase of the camshaft avoiding a valve lift. The plurality of rocker arms are coupled to one another along the forward movement of the coupling piston and the backward movement of the separation piston. The second coupling oil passage is opened during the forward movement of the coupling piston, and the coupling piston is held at a forward movement position by oil pressure in the second coupling oil passage, so that a coupling state of the plurality of rocker arms is maintained. When oil is supplied from the oil control valve to the separation piston, the oil is supplied to the separation piston through the separation oil groove at the predetermined rotation phase of the camshaft avoiding a valve lift. The plurality of rocker arms are separated from one another along the forward movement of the separation piston and the backward movement of the coupling piston. The second separation oil passage is opened during the forward movement of the separation piston, and the coupling piston is held at a backward movement position by the separation piston that receives oil pressure in the second separation oil passage, so that a separation state of the plurality of rocker arms is maintained.

According to a third aspect, in the second aspect, the coupling oil groove and the separation oil groove are formed such that the oil starts to be supplied from the oil control valve to the switching mechanism at an end timing of a valve lift or in a zero range where no valve lift occurs. According to this configuration, since the oil starts to be supplied from the oil control valve to the switching mechanism at the end timing of a valve lift or in the zero range, a coupling operation and a separation operation of the plurality of rocker arms is not hindered by a valve lift.

According to a fourth aspect, in the second or third aspect, the coupling piston and the separation piston are installed along a same straight line, and the first coupling oil passage and the second coupling oil passage are formed symmetrically to the first separation oil passage and the second separation oil passage across the plurality of rocker arms. According to this configuration, even when the coupling piston and the separation piston are provided in the switching mechanism, the variable valve device can be formed in a compact manner.

According to a fifth aspect, in any one of the first to the fourth aspect, the oil control valve includes a coupling port (76) for controlling the coupling piston, a separation port (77) for controlling the separation piston, an input port (74) communicating with an oil supply path, and a drain port (75) communicating with a drain passage, the input port communicates with one of the coupling port and the separation port, and the drain port communicates with the other one of the coupling port and the separation port. According to this configuration, the coupling piston and the separation piston are controlled by the single oil control valve, so that the variable valve device can be formed in a compact manner. It is possible to smoothly switch between coupling and separation of the plurality of rocker arms by changing a communication destination of each port in the oil control valve.

Although the present embodiment has been described, a part or all of the embodiment and modifications described above may be combined as another embodiment.

The technique according to the present disclosure is not limited to the embodiment described above, and may be variously changed, replaced, or modified without departing from the gist of the technical concept. Further, the present disclosure may be implemented by other methods as long as the technical concept can be implemented by the methods through advance of the technique or other derivative techniques. Therefore, the claims cover all embodiments that may fall within the scope of the technical concept.

What is claimed is:

1. A variable valve device for adjusting a valve lift amount in a cylinder head, the variable valve device comprising:

a plurality of cams formed on a camshaft, each cam including a different valve lift amount;

a plurality of rocker arms configured to be respectively engaged by the plurality of cams so as to actuate a valve;

a hydraulically-actuated switching mechanism configured to selectively couple the plurality of rocker arms to each other; and an oil control valve configured to control an oil pressure applied to the switching mechanism, wherein the switching mechanism includes a coupling piston and a separation piston each configured to be switched between an extended position and a retracted position via the oil pressure during a predetermined rotation phase of the camshaft, wherein, in a coupling state, the plurality of rocker arms are coupled to each other when the coupling piston is in the extended position and the separation piston is in the retracted position, wherein, in a separation state, the plurality of rocker arms are decoupled from each other when the separation piston is in the extended position and the coupling piston is in the retracted position, wherein the oil control valve includes:

a first coupling oil passage extending from the oil control valve to the coupling piston, a portion of the first coupling oil passage defined by a coupling oil groove formed on an outer circumferential surface of the camshaft such that oil flow through the first coupling oil passage is enabled during the predetermined rotation phase of the camshaft, a second coupling oil passage extending from the oil control valve to the coupling piston, the second coupling oil passage configured to (i) open as the coupling piston moves towards the extended position, and (ii) close as the coupling piston moves towards the retracted position, a first separation oil passage extending from the oil control valve to the separation piston, a portion of the first separation oil passage defined by a separation oil groove formed on the outer circumferential surface of the camshaft such that oil flow through the first separation oil passage is enabled during the predetermined rotation phase of the camshaft, and a second separation oil passage extending from the oil control valve to the separation piston, the second separation oil passage configured to (i) open as the separation piston moves towards the extended position, and (ii) close as the separation piston moves towards the retracted position, wherein, in the coupling state, oil is supplied to the coupling piston and discharged from the separation piston during the predetermined rotation phase of the camshaft, and wherein, in the separation state, oil is supplied to the separation piston and discharged from the coupling piston during the predetermined rotation phase of the camshaft.

2. The variable valve device according to claim 1, wherein the predetermined rotation phase of the camshaft corresponds to a base circle region of the plurality of cams.

3. The variable valve device according to claim 1, wherein the coupling piston and the separation piston are coaxially aligned, and the first coupling oil passage and the second coupling oil passage are symmetrically arranged with respect to the first separation oil passage and the second separation oil passage across the plurality of rocker arms.

4. The variable valve device according to claim 1, wherein the oil control valve further includes:

a coupling port configured to control the coupling piston, a separation port configured to control the separation piston, an input port communicating with an oil supply path, and a drain port communicating with a drain passage, and wherein the input port alternately communicates with the coupling port and the separation port, and the drain port communicates with a remaining one of the coupling port and the separation port.

* * * * *